US012132631B2

(12) United States Patent
Lee et al.

(10) Patent No.: US 12,132,631 B2
(45) Date of Patent: Oct. 29, 2024

(54) ON-DEVICE LATENCY DETECTION

(71) Applicant: T-Mobile USA, Inc., Bellevue, WA (US)

(72) Inventors: Do Kyu Lee, Mercer Island, WA (US); Tyler Gothmann, Renton, WA (US); Ryan Christopher Lindstrom, Olathe, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 15 days.

(21) Appl. No.: 17/949,131

(22) Filed: Sep. 20, 2022

(65) Prior Publication Data

US 2024/0098007 A1 Mar. 21, 2024

(51) Int. Cl.
*H04L 43/0864* (2022.01)
*H04L 43/106* (2022.01)
(Continued)

(52) U.S. Cl.
CPC ........ *H04L 43/0864* (2013.01); *H04L 43/106* (2013.01); *H04L 47/125* (2013.01); *H04L 61/4511* (2022.05)

(58) Field of Classification Search
CPC . H04L 47/125; H04L 43/106; H04L 61/4511; H04L 43/0864
(Continued)

(56) References Cited

U.S. PATENT DOCUMENTS 7,719,979 B1 5/2010 Chatterjee
7,756,830 B1 7/2010 Chao et al.
(Continued)

FOREIGN PATENT DOCUMENTS

| CN | 107078928 B | 9/2020 |
|---|---|---|
| CN | 107430514 B | 2/2021 |

(Continued)

OTHER PUBLICATIONS

An SMP-based, low-latency, network interface unit and latency measurement system: the SNAPpy system G.J. Valentino; S.T. Thompson; T. Kniola; C.J. Carlisle Proceedings. 2nd International Workshop on Distributed Interactive Simulation and Real-Time Applications (Cat. No. 98EX191) Year: 1998 ConferencE (Year: 1998).*

(Continued)

*Primary Examiner* — Younes Naji
(74) *Attorney, Agent, or Firm* — Perkins Coie LLP

(57) ABSTRACT

Aspects of the present disclosure relate to implementing on-device latency detection into operating system (OS)-level functionality of a client device in client-server and/or network communications. An example method includes extracting packet headers from data-connection packets transmitted between a local application client and a remote application server. Data records including packet headers and timestamps are stored. Data records for related data-connection packets (e.g., queries and responses, handshakes) are identified via the packet headers, and timestamps of the identified data records are compared to determine latency measurements. Latency measurements are then distributed to relevant application clients locally residing on an upper layer. The latency measurements are presented in dashboard display to an end user and used for server-side dynamic load balancing.

18 Claims, 7 Drawing Sheets

(51) Int. Cl.
*H04L 47/125* (2022.01)
*H04L 61/4511* (2022.01)

(58) Field of Classification Search
USPC .......................................................... 709/244
See application file for complete search history.

(56) References Cited

U.S. PATENT DOCUMENTS

| | | |
|---|---|---|
| 7,826,376 B1 | 11/2010 | Kritov et al. |
| 8,005,030 B2 | 8/2011 | Stephenson et al. |
| 8,204,986 B2 | 6/2012 | Wexler et al. |
| 9,954,756 B2 | 4/2018 | Sella et al. |
| 10,469,351 B2 | 11/2019 | Pall et al. |
| 10,659,571 B1 * | 5/2020 | Volpe ................. H04L 69/22 |
| 11,240,156 B2 | 2/2022 | Fedorov et al. |
| 11,245,606 B1 | 2/2022 | Sinha et al. |
| 11,347,625 B1 * | 5/2022 | Agarwal .............. G06F 11/323 |
| 11,349,736 B1 | 5/2022 | Cheng et al. |
| 11,438,805 B2 | 9/2022 | Polehn et al. |
| 11,477,161 B1 * | 10/2022 | Mishra ................ H04L 61/4511 |
| 11,670,062 B1 * | 6/2023 | Bhushan ................ G06F 9/451 345/633 |
| 11,966,783 B1 * | 4/2024 | Lin ...................... G06F 9/5038 |
| 2006/0135258 A1 | 6/2006 | Maheshwari et al. |
| 2016/0226731 A1 * | 8/2016 | Maroulis ............. H04L 69/40 |
| 2017/0302554 A1 | 10/2017 | Chandrasekaran et al. |
| 2020/0136942 A1 * | 4/2020 | Rastogi .............. H04L 63/1425 |
| 2020/0204496 A1 * | 6/2020 | Cherukuru ............ H04L 69/16 |
| 2020/0252185 A1 * | 8/2020 | Zhang .................. H04L 5/0053 |
| 2021/0329496 A1 | 10/2021 | Koodli |
| 2022/0006747 A1 | 1/2022 | Khandelwal et al. |
| 2022/0086684 A1 | 3/2022 | Claeson et al. |
| 2022/0150153 A1 * | 5/2022 | Clancy ................ H04L 43/0852 |
| 2022/0158941 A1 | 5/2022 | Fedorov et al. |

FOREIGN PATENT DOCUMENTS

| | | | |
|---|---|---|---|
| CN | 112313991 | A | 2/2021 |
| DE | 202016008885 | U1 | 5/2020 |
| EP | 1330889 | A2 | 7/2003 |
| EP | 1618705 | B1 | 4/2008 |
| EP | 1972073 | A2 | 9/2008 |
| EP | 2301635 | B1 | 3/2013 |
| EP | 3266168 | B1 | 7/2019 |
| EP | 3797493 | A1 | 3/2021 |
| JP | 2003530623 | A | 10/2003 |
| JP | 6547001 | B2 | 6/2019 |
| JP | 6699065 | B2 | 5/2020 |
| WO | 0120918 | A2 | 3/2001 |
| WO | 2004093386 | A1 | 10/2004 |
| WO | 2007100402 | A2 | 9/2007 |
| WO | 2011025583 | A1 | 3/2011 |
| WO | 2013189021 | A1 | 12/2013 |
| WO | WO-2014055680 | A2 * | 4/2014 .......... H04L 45/121 |
| WO | 2016144821 | A1 | 9/2016 |
| WO | 2020233821 | A1 | 11/2020 |
| WO | 2021046263 | A1 | 3/2021 |

OTHER PUBLICATIONS

An SMP-based, low-latency, network interface unit and latency measurement system: the SNAPpy system G.J. Valentino; S.T. Thompson; T. Kniola; C.J. Carlisle Proceedings. 2nd International Workshop on Distributed Interactive Simulation and Real-Time Applications (Cat. No. 98EX191) (Year: 1998).*

Sharpe, Richard, et al., "Wireshark User's Guide", https://www.wireshark.org/download/docs/Wireshark%20User%27s%20Guide.pdf, Version 4.1.0, pp. 1-339.

International Searching Authority, International Search Report and Written Opinion, PCT Patent Application PCT/US2023/033242, mailed Jan. 10, 2024, 13 pages.

* cited by examiner

ON-DEVICE LATENCY DETECTION

BACKGROUND

Latency is used as a performance characteristic for communications between systems or devices, such as in a telecommunications network. Various communication protocols and architectures are designed with an objective to minimize latency. In order to monitor and evaluate performance of network communications, latency measurements must be obtained.

Network delay or latency generally describes a time that elapses as data is communicated between two endpoints. That is, latency is a performance characteristic that quantitatively indicates how fast (or slow) data is transmitted and/or received. With data communications striving for instantaneous or near-instantaneous transmission, lower latency is preferred over high latency, and high latency scenarios are associated with communication failures, communication inefficiencies, and/or negative user experiences. Accordingly, information on latency can be used to design or improve communication protocols, diagnose bottlenecks or faults, perform remedial actions in high-latency scenarios, inform on communication factors such as transmission medium characteristics, and/or the like.

Various deficiencies and challenges relating to latency measurement have been identified and are addressed by solutions disclosed herein. In network settings, latency is typically determined on a server system and used to monitor the transmissions of the server system to client devices. Client devices commonly lack inherent functionality to measure and detect latency, as latency is considered a natural characteristic and accepted consequence of network communication. Upper layer applications residing on a client device (e.g., e-mail applications, web browsers, video streaming applications, and the like) are not configured with a capability to detect or measure latency. These upper layer applications residing on a client device instead rely upon server-side latency measurements being provided, if at all. Typically, a client device is limited to receiving an error message from a server system about high (e.g., threshold-triggering) latency scenarios and is blind to network latency otherwise.

As such, transparency into communication performance for upper layer applications is not available to end users of client devices. For an end user interacting with an upper layer application client residing on a client device, the end user can observe negative effects of latency, including lag, video artifacts, and delays or failures to load webpages or mail folders. However, the end user lacks insight on specific latency measurements and values at all times, including during low latency scenarios.

In testing environments, packet analyzer applications (e.g., Wireshark) are available for installation on a client device for inspection and analysis of data packets transmitted to and from the client device. These existing applications require user input to explicitly begin recording packet transmissions to and from the client device and actively consume processing bandwidth to record the packet transmissions. Upon conclusion of the recording activities, these existing applications output a log that includes data for each recording packet transmission. Users, such as testing engineers and communications engineers, are limited to manually scrolling through such logs and inspecting specific packet data to arrive at a latency measurement. As such, end users are limited to manual post-hoc latency measurements based on explicit user inputs when relying upon these existing applications.

Further, reliance on these existing applications and the installation thereof on a client device presents security risks for the client device, due to a potential for malware being inserted into installed software and for recorded transmission information being distributed in an unauthorized or non-secure manner. That is, relying upon additional third-party software being installed on a client device to enable measurement of latency introduces challenges to the security of the client device.

BRIEF DESCRIPTION OF THE DRAWINGS

Detailed descriptions of implementations of the present technology will be described and explained through the use of the accompanying drawings.

Figure 1A:
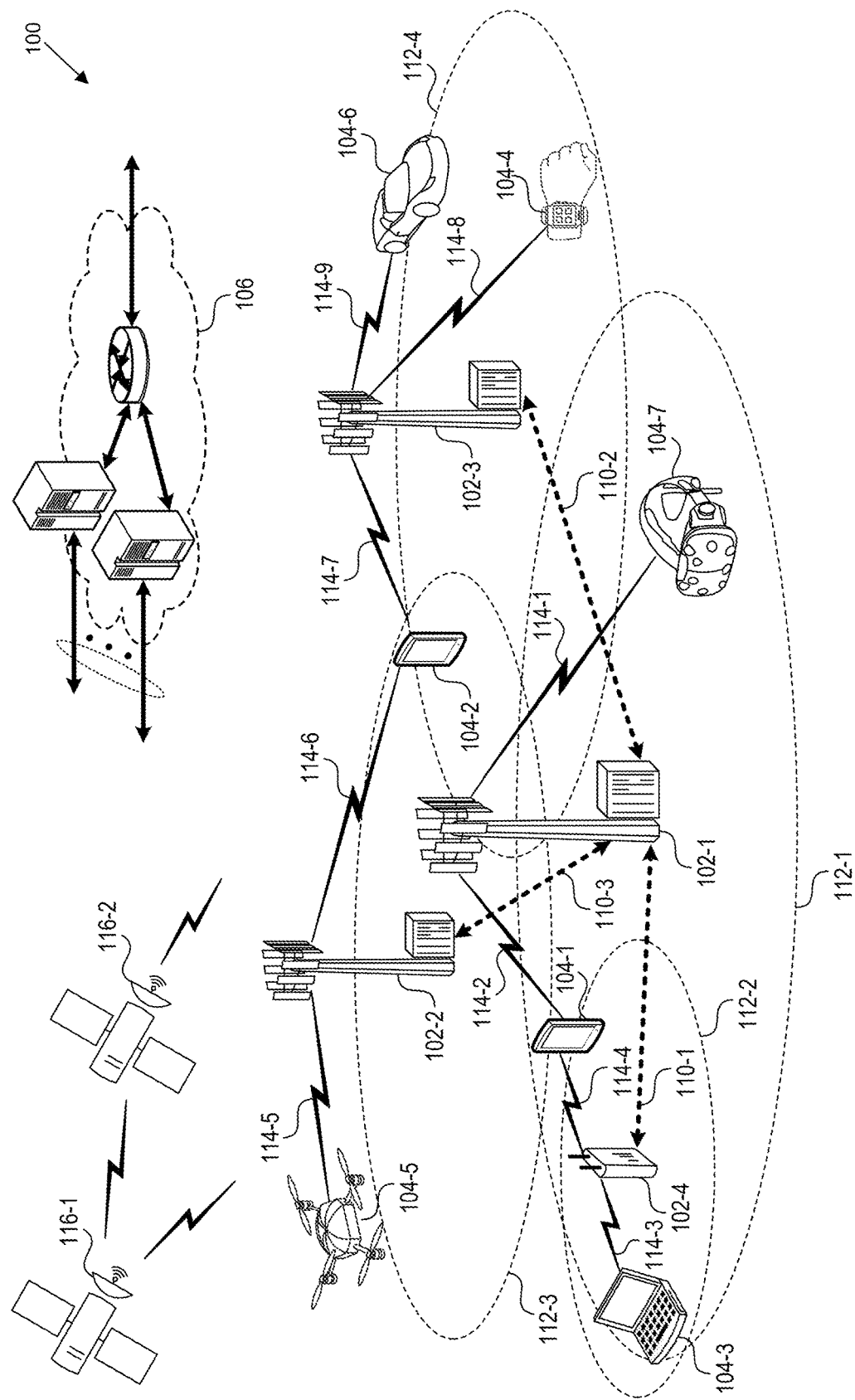
FIG. 1A is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Disclosed herein are systems and related methods for providing on-device latency measurement and detection, and example implementations disclosed herein provide solutions that address at least the technical challenges identified above. In particular, the present disclosure discloses example implementations for on-device detection and/or measurement of data connection latency for data packets transmitted between application clients local to a client device and application servers remote to the client device. In various examples, latency can be detected for domain name system (DNS) protocol communications, transmission control protocol (TCP) communications, user datagram protocol (UDP) communications, QUIC communications, and other types of communications.

In example implementations, on-device latency detection and/or measurement is performed at an operating system (OS) level or layer of the client device. In doing so, the on-device latency detection and/or measurement is performed in the background (e.g., passively) as upper layer applications continue to operate. Additionally, latency measurements determined at the OS level can be non-discriminatively distributed to upper layer applications residing on the client device. Latency detection and/or measurement being a functionality incorporated into the core functionality of the client device at the OS level then precludes a need to install third-party applications related to latency measurement, thereby improving security of the client device.

To determine latency measurements locally at the OS level of a client device, example implementations involve parsing of data packets as the packets are transmitted or received by the client device and extracting relevant portions of data-connection packets, such as packet headers. In particular, portions of a data-connection packet that indicate relationships with other data-connection packets are extracted. For example, such relationships include query-response relationships, handshake relationships, and/or the like in which a data-connection packet responds to, acknowledges, or synchronizes with another data-connection packet. In some examples, the data packets are parsed in real-time, or at a time that is concurrent with or within a time window after the transmission or reception of the data packets. For example, a communications module of the client device that is configured to process the data packets for transmission and/or during reception is further configured to parse and extract packet headers while processing the data packets.

Data records that include the extracted packet portions and a timestamp are generated and securely stored. Given identification of a group of data records that correspond to related data-connection packets via the extracted packet portions, one or more latency measurements are determined from the timestamps of the identified data records. In some implementations, latency measurements are determined and then distributed to upper layer applications in non-real time, such as in response to a query by an upper layer application or a threshold condition being satisfied. In some implementations, latency measurements are distributed to upper layer applications upon being determined.

Accordingly, example implementations disclosed herein address existing challenges in the field. For example, passive measurement of latency at the OS level of a client device reduces reliance on third-party (and potentially malicious) applications. Example implementations also reduce reliance on receiving server-side latency measurements, thereby clearing network bandwidth for other messages and communications.

Further, each upper layer application of a client device is able to invoke native and passive latency detection at the OS level. As such, upper layer applications do not require their own logic for determining latency measurements and do not consume computing resources for doing so. In some implementations, detection and/or measurement of latency at the OS level enables protocol- or service-wise analysis of data connection latency such that upper layer applications can select optimal protocols or services for their needs. Additionally, example implementations enable both non-real time and real time distribution of latency measurements to upper layer application.

Example implementations also enable and/or improve post-latency actions, including those performed by remote servers or systems with which a client device communicates. As one example, on-device and device-specific latency measurements are provided to a remote system configured for dynamic load balancing, whereupon the remote system can appropriately route network traffic from multiple client devices to optimize latency among the multiple client devices. As another example, detection and measurement of latency natively on the client device enables the client device to present a dashboard display of latency information immediately without delays associated with receiving latency information from a remote server. As such, an end user of the client device can more efficiently understand, diagnose, and remedy latency-related issues of the client device.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Exemplary Environments

FIG. 1A is a block diagram that illustrates a wireless telecommunication network 100 ("network 100") in which aspects of the disclosed technology are incorporated. For example, a client device can communicate with a remote server via the network 100, communicate with a server of the network 100, and/or the like. According to aspects of the present disclosure, the client device can locally determine latency measurements related to such communications through and/or within the network 100.

The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. For example, a client device that communicates with remote servers via the network 100 can embody a wireless device 104. In some examples, a remote server or system with which a client device communicates via the network 100 can also embody a wireless device 104. The wireless devices 104-1 through 104-7 can correspond to or include network entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. In some examples, the core network 106 includes distributed computing servers that perform operations to provide the various services and functions of the core network 106. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (ARNR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

As indicated, wireless devices 104 can transmit data to and/or receive data from remote servers via the network 100. The remote servers can also be connected to the network 100 via NANs of the network 100 in some examples. In some examples, the remote servers are in a data network (not shown) that is connected to the network 100. The wireless devices 104 can send, query for, and receive application data, webpage content, call data, texts or other messages (e.g., Short Message Service (SMS) or Rich Communication Services (RCS) messages), and other data via the network 100. In particular, the wireless devices 104 include client devices that communicate with remote servers (e.g., application servers) to send and receive application that is generate or consumed by end users of the wireless devices 104. As an example, the remote servers with which the wireless devices 104 communicate (e.g., via the network 100) include DNS servers (e.g., root servers, recursive resolvers, top-level domain servers, authoritative servers) that provide responses to DNS queries transmitted by wireless devices 104. As another example, the remote servers include web servers, email servers, servers configured to stream video or audio content, voice over internet protocol (VoIP) servers, and/or the like that communicate data with the wireless devices 104.

In some implementations, the wireless devices 104 and the remote servers are configured to establish a data connection according to various communication protocols in order for data to be transmitted between the wireless devices 104 and the remote servers (e.g., via the network 100). For example, a wireless device 104 and a remote server establish a data connection or stream according to TCP such that content (e.g., hypertext transfer protocol (HTTP) content, file transfer protocol (FTP) content, simple mail transfer protocol (SMTP) content) is communicated between the wireless device 104 and the remote server (e.g., via the network 100). Establishing the data connection involves multiple data-connection packets being transmitted between the wireless device 104 and the remote server to signal states and acknowledgement of the wireless device 104 and the remote server.

Thus, with the network 100 illustrated in FIG. 1A, client devices (e.g., wireless devices 104) can communicate data back and forth and establish connections with remote servers and systems. As discussed herein, on-device latency detection refers to a client device (e.g., wireless device 104) locally or natively determining latency measurements, and in example implementations, the client device does so based on packets that the client device transmits to remote servers and packets that the client device receives from remote servers. As such, a client device according to an example implementation does not rely upon server-side latency information being provided to the client device.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultra-high quality of service requirements and multi-terabits per second data transmission in the 6G and beyond era, such as terabit-per-second backhaul systems, ultra-high definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

Figure 1B:
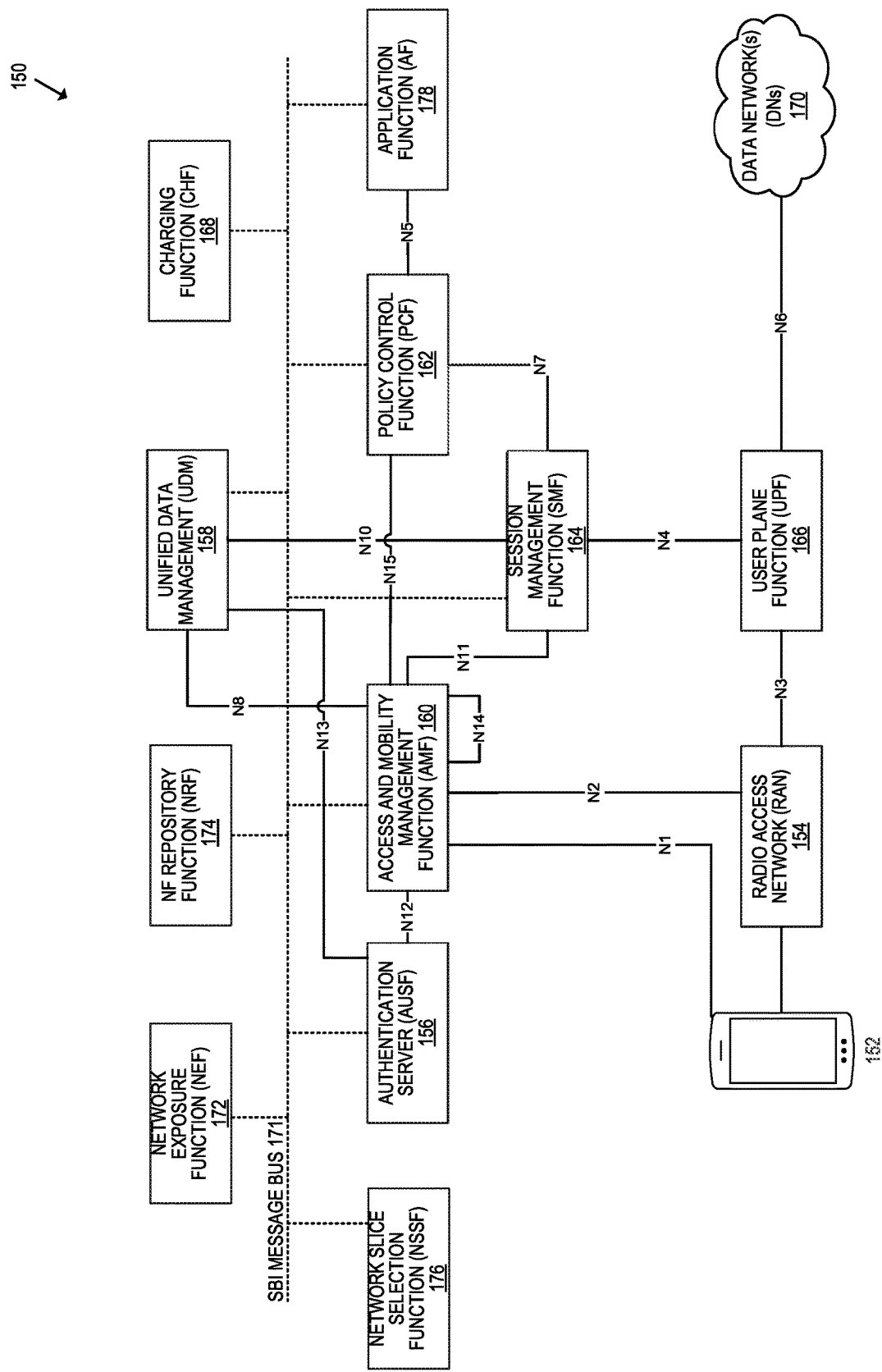
FIG. 1B is a block diagram that illustrates 5G core network functions (NFs) that can be included in a system that implements aspects of the present technology.

FIG. 1B is a block diagram that illustrates an architecture 150 including 5G core network functions (NFs) that can be included in a core network 106 and implemented at and/or across multiple network servers. A wireless device 152 can access the 5G network through a NAN (e.g., gNB) of a RAN 154. The NFs include an Authentication Server Function (AUSF) 156, a Unified Data Management (UDM) 158, an Access and Mobility management Function (AMF) 160, a Policy Control Function (PCF) 162, a Session Management Function (SMF) 164, a User Plane Function (UPF) 166, and a Charging Function (CHF) 168.

The interfaces N1 through N15 define communications and/or protocols between each NF as described in relevant standards. The UPF 166 is part of the user plane and the AMF 160, SMF 164, PCF 162, AUSF 156, and UDM 158 are part of the control plane. One or more UPFs can connect with one or more data networks (DNs) 170. The UPF 166 can be deployed separately from control plane functions. The NFs of the control plane are modularized such that they can be scaled independently. As shown, each NF service exposes its functionality in a Service Based Architecture (SBA) through a Service Based Interface (SBI) 171 that uses HTTP/2. The SBA can include a Network Exposure Function (NEF) 172, a NF Repository Function (NRF) 174, a Network Slice Selection Function (NSSF) 176, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 174, which maintains a record of available NF instances and supported services. The NRF 174 allows other NF instances to subscribe and be notified of registrations from NF instances of a given type. The NRF 174 supports service discovery by receipt of discovery requests from NF instances and, in response, details which NF instances support specific services.

The NSSF 176 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 152 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 158 and then requests an appropriate network slice of the NSSF 176.

The UDM 158 introduces a User Data Convergence (UDC) that separates a User Data Repository (UDR) for storing and managing subscriber information. As such, the UDM 158 can employ the UDC under 3GPP TS 22.101 to support a layered architecture that separates user data from application logic. The UDM 158 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 158 can contain voluminous amounts of data that is accessed for authentication. Thus, the UDM 158 is analogous to a Home Subscriber Server (HSS), to provide authentication credentials while being employed by the AMF 160 and SMF 164 to retrieve subscriber data and context.

The PCF 162 can connect with one or more application functions (AFs) 178. The PCF 162 supports a unified policy framework within the 5G infrastructure for governing network behavior. The PCF 162 accesses the subscription information required to make policy decisions from the UDM 158, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 174. This allows the SCP to become the delegated discovery point in a datacenter, offloading the NRF 174 from distributed service meshes that make-up a network operator's infrastructure. Together with the NRF 174, the SCP forms the hierarchical 5G service mesh.

The AMF 160 receives requests and handles connection and mobility management while forwarding session management requirements over the N11 interface to the SMF 164. The AMF 210 determines that the SMF 164 is best suited to handle the connection request by querying the NRF 174. That interface and the N11 interface between the AMF 160 and the SMF 164 assigned by the NRF 174, use the SBI 171. During session establishment or modification, the SMF 164 also interacts with the PCF 162 over the N7 interface and the subscriber profile information stored within the UDM 158. Employing the SBI 171, the PCF 162 provides the foundation of the policy framework which, along with the more typical QoS and charging rules, includes Network Slice selection, which is regulated by the NSSF 176.

Figure 2:
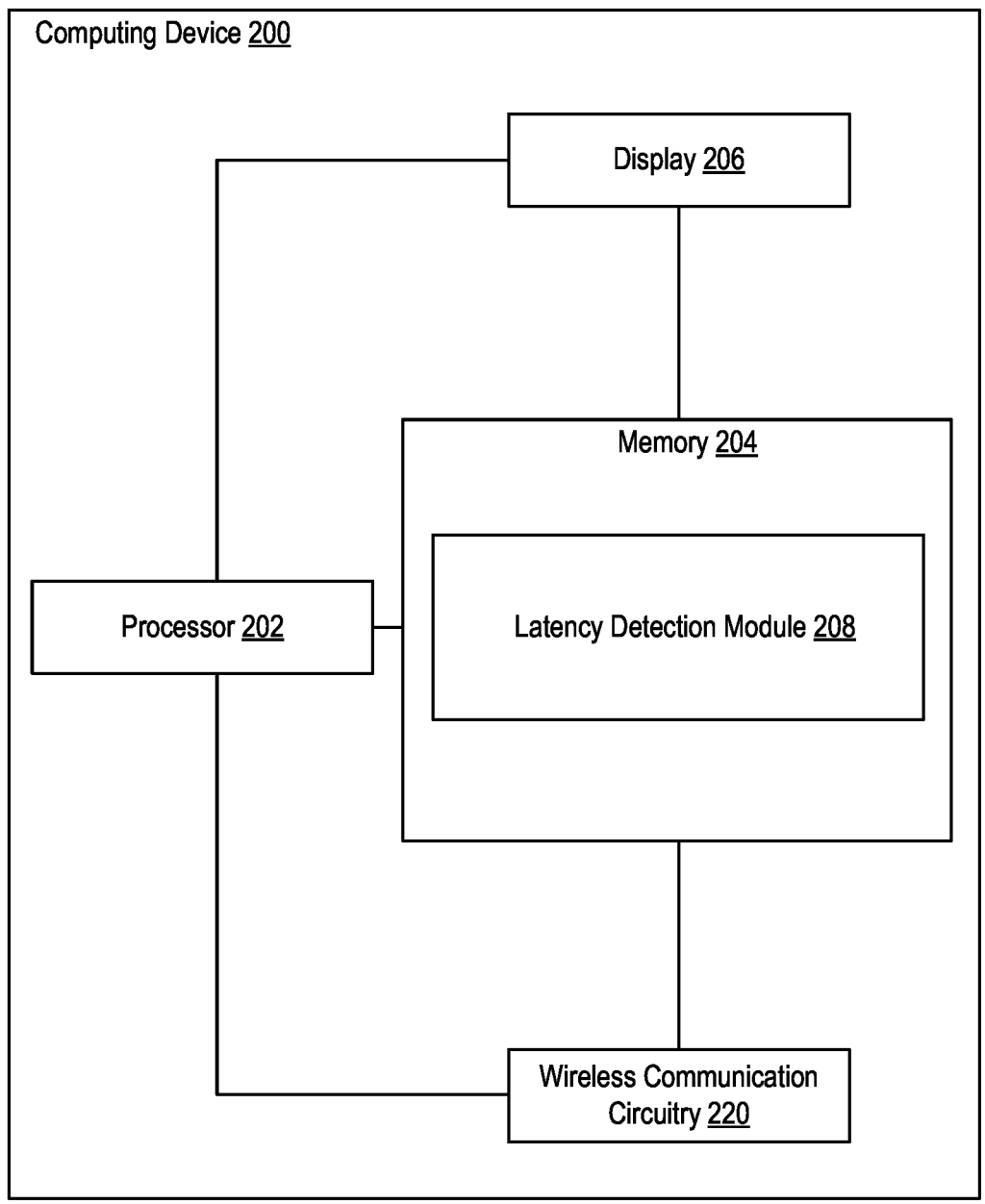
FIG. 2 is a block diagram that illustrates components of a computing device configured for example implementations disclosed herein.

FIG. 2 is a block diagram that illustrates components of a computing device 200. For example, the computing device 200 embodies a wireless device 104 of FIG. 1A or a wireless device 152 of FIG. 1B, and the computing device 200 is configured to perform operations disclosed herein for on-device latency detection. Accordingly, computing device 200 includes components configured for locally or natively determining data connection latency between application clients residing on the computing device 200 and application servers that are remote to the computing device 200.

The components shown in FIG. 2 are merely illustrative and well-known components are omitted for brevity. As shown, the computing device 200 includes at least one processor 202, at least one memory 204, and a display 206. The computing device 200 also includes wireless communication circuitry 220 designed to establish wireless communication channels with other computing devices. For example, the computing device 200 generates data-connection packets according to various communication protocols and transmits the data-connection packets to a server via the wireless communication circuitry 220. Similarly, the computing device 200 receives data-connection packets from a server via the wireless communication circuitry 220 and decodes the received data-connection packets according to various communication protocols to extract information that can be consumed by an end user of the computing device 200.

The processor 202 can have generic characteristics similar to general-purpose processors, or the processor 202 can be an application-specific integrated circuit (ASIC) that provides arithmetic and control functions to the computing device 200. While not shown, the processor 202 can include a dedicated cache memory. The processor 202 can be coupled to all components of the computing device 200, either directly or indirectly, for data communication.

The memory 204 can be comprised of any suitable type of storage device including, for example, a static random-access memory (SRAM), dynamic random-access memory (DRAM), electrically erasable programmable read-only memory (EEPROM), flash memory, latches, and/or registers. In addition to storing instructions which can be executed by the processor 202, the memory 204 can also store data generated by the processor 202 (e.g., data connection packets, timestamps, data records corresponding to packets, latency measurements). The memory 204 is merely an abstract representation of a storage environment. Hence, in some implementations, the memory 204 is comprised of one or more actual memory chips or modules.

An example of the display 206 includes a touch-enabled display or a non-touch-enabled display, in which case the computing device 200 likely also includes (or is connected to) an input device such as a keyboard. An example of the wireless communication circuitry 220 forms and/or communicate with a network for data transmission among computing devices, such as personal computers, mobile phones, and computer servers. The wireless communication circuitry 220 can be used for communicating with these computing devices or for connecting to a higher-level network (e.g., a LAN) or the Internet. Examples of wireless communication circuitry 220 include Bluetooth, Z-Wave, ZigBee, and the like. In some implementations, the connection established by the wireless communication circuitry 220 can be bootstrapped by a near field communication (NFC) connection.

For convenience, the latency detection module 208 can be referred to as a computer program that resides within the memory 204. The term "module" refers broadly to software components, firmware components, and/or hardware components. Accordingly, the latency detection module 208 could be comprised of software, firmware, and/or hardware components implemented in, or accessible to, the computing device 200. According to aspects of the present disclosure, the latency detection module 208 is implemented with OS level software or firmware stored in the memory 204. In some implementations, the latency detection module 208 cooperates with other modules, processes, daemons, and/or the like within the OS level software/firmware to provide on-device latency detection.

Exemplary Non-Real Time Latency Detection

Figure 3:
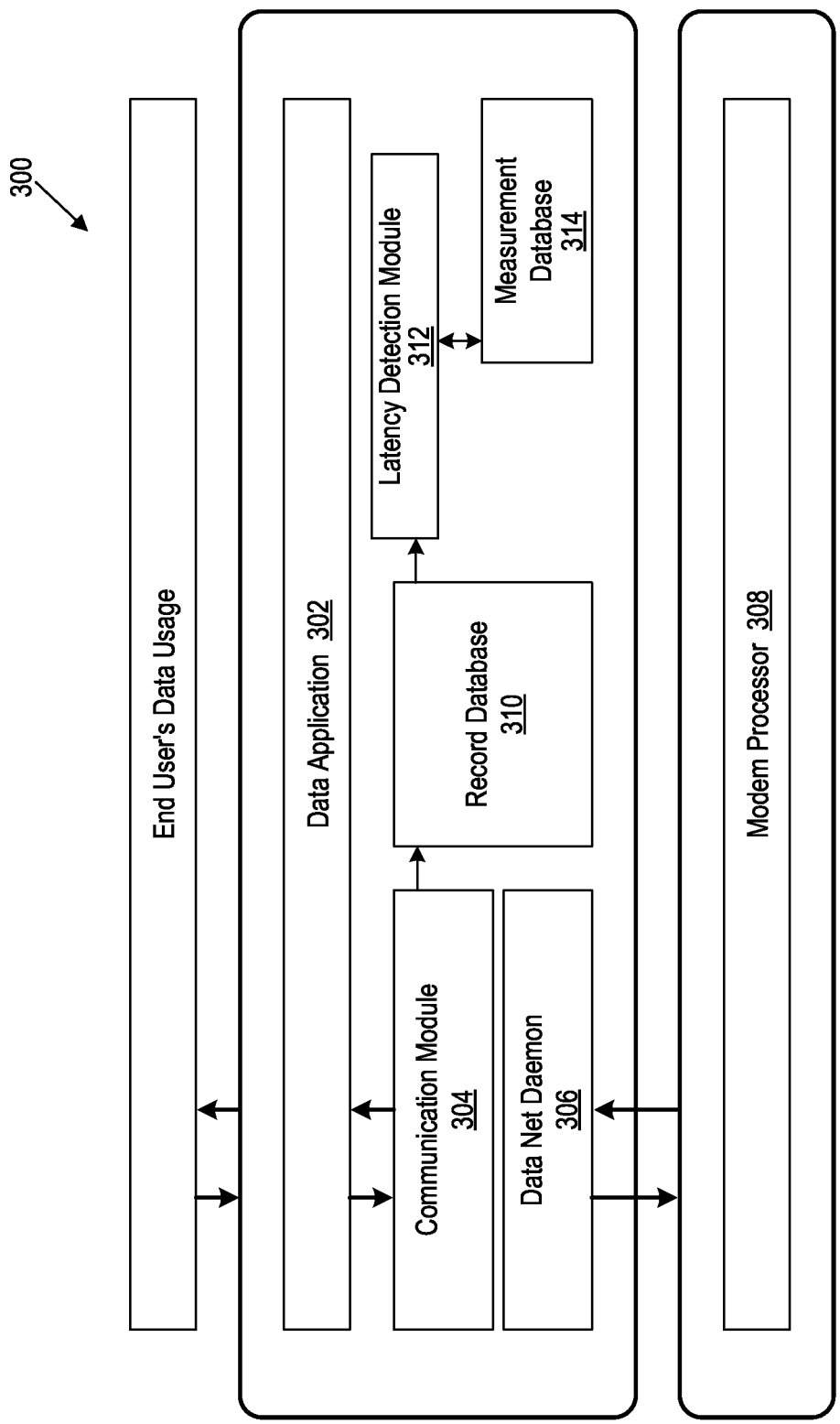
FIG. 3 is a block diagram that illustrates components or modules for providing on-device latency detection in non-real time.

Referring now to FIG. 3, a block diagram that illustrates components of a client device 300 is provided. The client device 300 includes components for locally and natively determining latency measurements for data connections between local application clients and remote application servers. For example, some components of the client device 300 as illustrated and described herein can correspond to a latency detection module 208 illustrated in FIG. 2. In some implementations, components of client device 300 for on-device latency detection are configured to determine latency measurements in the background at an OS level of the client device 300. According to some aspects of the present disclosure, the latency measurements are provided or distributed to local application clients residing in an upper level or layer of the client device 300 in a non-real time manner.

As illustrated in FIG. 3, an upper layer data application 302 resides on the client device 300. The upper layer data application 302 can be an e-mail application, a video streaming application, an entertainment and/or gaming application, a messaging application, a web browser, and/or other applications with which an end user of the client device 300 interacts. For example, the upper layer data application 302 can receive data generated by the end user (e.g., outgoing e-mails and/or messages, webpage navigation, game inputs, video playback controls) and present data for end user consumption.

In its operation, the upper layer data application 302 communicates with a remote server or system to establish a connection or data stream, to transmit information such as user inputs or reports, to querying for remote data managed or generated by the remote server, and to receive the remote data from the remote server. In doing so, the upper layer data application 302 communicates with the remote server according to defined communication protocols, such as those defined in a TCP/IP protocol suite. For example, communications between the upper layer data application 302 and the remote server are configured as packets according to DNS, TCP, UDP, QUIC, and/or the other protocols in the TCP/IP protocol suite (e.g., at least one network layer protocol, at least one transport layer protocol, and at least one application layer protocol).

The client device 300 includes various components to configure packets for transmission according to particular communication protocols based on data and commands provided by the upper layer data application 302. These components can also decode packets received from the remote server or system according to the particular communication protocols and provide information and content to the upper layer data application 302. As illustrated, the client device 300 includes a framework or communication module 304 that is configured to support upper layer data applications 302 by preparing data packets for transmission and extracting data payloads from received data packets for the upper layer data applications 302. As such, packets that include queries for information, responses with information, connection establishment requests, and data streams pass through and are processed by the communication module 304.

In some implementations, the communication module 304 includes a plurality of sub-modules each associated with a communication protocol. For example, the communication module 304 includes a DNS encoder and/or resolver configured to generate and/or interpret DNS packets, a TCP encoder and/or parser configured to generate and/or interpret TCP packets, a UDP sub-module configured to generate and/or interpret UDP messages, a QUIC sub-module configured to generate and/or interpret QUIC messages, and/or the like. The communication module 304 resides in the OS level of the client device 300 to be shared or invoked by each or any upper layer data application residing on the client device 300. For example, the communication module 304 includes TCP/IP software residing in the OS level (e.g., a kernel) of the client device 300.

The communication module 304, with a daemon 306, causes packets to be physically transmitted, via the modem processor 308, to the remote server. Similarly, the communication module 304, with the daemon 306, receives and parses packets that are received at the modem processor 308 from a remote server. In some examples, the communication module 304 is a middleware module in the device's operating system that handles designated parameters between the upper layer data application 302 and the operating system. For example, the parameters and data handled by the communication module 304 are comprehensible by high-level object formats, such as text strings and IP addresses. In some examples, the daemon 306 is a low-level module to communicate with the modem processor 308 from the operating system (or an OS application processor). At the daemon 306, each parameter is parsed into bits and bytes based on telecommunication standards (e.g., Internet, TCP/IP).

According to aspects of the present disclosure, latency is locally measured while the communication module 304, the daemon 306, and the modem processor 308 operate to provide communications between the upper layer data application 302 and a remote server. That is, while the communication module 304 operates to establish a data connection, to cause transmission of queries or messages, or to receive information from the remote server, components of the client device 300 operate in the background (e.g., passively) to determine latency measurements.

In particular, while the communication module 304 processes packets for transmission or processes received packets, the communication module 304 records the headers of the packets. The recording is done passively, for example, as the communication module 304 inherently generates the packet headers when processing packets for transmission or inherently parses the packet headers when processing received packets.

The packet header of a packet is configured according to one or more communication protocols and indicates metadata related to the packet (or the data payload thereof). In some implementations, the communication module 304 records packet headers of packets that are data-connection packets, such as DNS queries, DNS responses, and TCP packets involved in a TCP handshake. The TCP handshake involves at least three TCP packets that establish ready states and acknowledgement between endpoints, and the communication module 304 records packet headers for a first set of three TCP packets, for example. As another example, the communication module 304 records packet headers for a first set of TCP packets that are processed within an initial time period of a pre-determined length, to account for transmission failures and re-transmissions.

The communication module 304 records the packet headers in a first database 310 of the client device 300, and in conjunction, the communication module 304 records a timestamp with the recorded packet header. In some implementations, the timestamp indicates a time at which the data-connection packet passes through the communication module 304 (e.g., for transmission, after being received). In some implementations, the timestamp indicates a time at which the communication module 304 records the packet header in the first database 310. In some implementations, the timestamp indicates a time at which the data-connection packet will be transmitted by the client device 300 (e.g., by the modem processor 308), or a time at which the data-connection packet was received by the client device 300 (e.g., by the modem processor 308). The timestamp can indicate a local device time according to a coordinated universal time. In some examples, the device does not rely upon retrieval or fetching of time data, and the communication module 304 uses time tick of a CPU processor as a recorded timestamp.

In some implementations, the communication module 304 further indicates an upper layer data application associated with the data-connection packet, for example, the application that requested that the data-connection packet be sent or the application to whom the data-connection packet is addressed. Accordingly, the communication module 304 records an application identifier (e.g., a process ID) with the recorded packet header.

Thus, the communication module 304 records packet headers and associated information of data-connection packets in the first database 310. With the first database 310, a latency detection module 312 residing in the operating system of the client device 300 can generate data records that represent or describe the data-connection packets. In particular, specific relevant portions of the packet headers can be extracted to form lightweight and compact data records that correspond to data-connection packets and from which latency measurements can be determined.

For example, the latency detection module 312 is configured to extract a transaction identifier, a QR bit, and a response code from DNS packet headers stored in the first database 310 by the communication module 304. As such, a data record for a DNS packet (e.g., a DNS query, a DNS response) can include the transaction identifier, the QR bit, the response code, a timestamp, and an application or process identifier, for example. For example, the latency detection module 312 is configured to extract control bits, a sequence number, and an acknowledgement number from TCP packet headers stored in the first database 310 by the communication module 304. As such, a data record corresponding to a TCP packet can include control bits, a sequence number, an acknowledgement number, a timestamp, and an application or process identifier, for example. In some implementations, success/fail bits or header portions indicating a re-transmission are also extracted.

In some implementations, such data records are generated by the latency detection module 312 based on extracting and editing packet headers stored in the first database 310 by the communication module 304. In other implementations, the communication module 304 is configured to only store relevant portions of packet headers in the first database 310 and to generate the data records with the timestamps and application identifiers. Given than the first database 310, the communication module 304, and the latency detection module 312 reside in the operating system of the client device 300, memory storage can be limited. Thus, memory usage at the first database 310 can be managed based on extracting portions of the packet headers of data-connection packets.

The first database 310 then stores data records that correspond to and represent data-connection packets transmitted between an upper layer data application residing on the client device 300 (e.g., the upper layer data application 302) and a remote server. In some implementations, the first database 310 is configured to be accessible only by the communication module 304 and the latency detection module 312 in order to preserve privacy and security among different applications. To manage access to the first database 310, OS level software or a kernel of the client device 300 can generate and manage access or security policies that define what modules, processes, applications, and/or the like can access the first database 310. Thus, in some examples, OS-level access policies of the client device 300 can restrict upper layer data applications from accessing the first database 310.

With the first database 310 storing the data records, the latency detection module 312 can then access the first database 310 at any time to determine latency measurements. In particular, the latency detection module 312 accesses the first database 310 to identify data records that correspond to a set of corresponding data-connection packets, such as a DNS query-response pair or a set of TCP packets establishing a handshake. These data records are identified by the latency detection module 312 using the extracted portions of the packet headers that indicate the relationships between the data-connection packets. For example, the transaction identifier and the QR bit of DNS packets indicate whether two DNS packets are a query-response pair. If the two DNS packets have the same transaction identifier and an opposite value of the QR bit, the two DNS packets are related as a query-response pair.

As another example, the control bits, sequence numbers, and acknowledgement numbers of TCP packets indicate whether a set of TCP packets establish a handshake. Specifically, relative sequence numbers and relative acknowledgement numbers in the packet headers increment in pairs from 0,0 (SYN) to 0,1 (SYN-ACK) to 1,1 (ACK) over three TCP packets to indicate a handshake. In some implementations, the data records include raw sequence numbers and raw acknowledgement numbers, which are converted to relative numbers by the latency detection module 312 when identifying corresponding data records. With this incrementing pattern of sequence numbers and acknowledgment numbers, related TCP packets involved in a handshake can be identified.

Thus, the packets headers of data-connection packets can be understood as referencing other related data-connection packets. Via the packet header portions of the data records, the latency detection module 312 can match data records together. Upon matching data records, the latency detection module 312 can determine a latency measurement based on comparing the timestamps of the matched data records. For example, the latency detection module 312 determines a latency measurement for a pair of data records corresponding to a DNS query and a DNS response based on a difference between the two timestamps of the pair of data records. As another example, the latency detection module 312 determines one or more latency measurements for a set of data records corresponding to TCP handshake packets based on a time spanned by the timestamps of the data records. Latency measurements representing a total time spanned by a SYN, SYN-ACK, and ACK handshake, a time between SYN and SYN-ACK, or a time between SYN-ACK and ACK can be determined from the timestamps of the data records.

The latency detection module 312 then stores the latency measurements in a second database 314. In doing so, a capacity of the first database 310 is maintained and reserved for the storage of data records and/or packet headers. Further, in some implementations, the second database 314 is configured with different access or security policies than the first database 310. As the second database 314 is used to store latency measurements and does not store packet information, access and security policies are configured so that the second database 314 is shared with and accessible by the upper layer data applications residing on the client device 300.

In the second database 314, additional information relating to the data-connection packets is stored with the latency measurements. For example, with a given latency measurement, success/fail bits of the relevant data-connection packets are indicated in the second database 314. As another example, a number of the relevant data-connection packets that are re-transmissions is stored with a latency measurement. In some implementations, a latency measurement is stored with an application identifier (e.g., a process ID) for an upper layer data application to which the latency measurement is relevant.

From the second database 314, latency measurements are provided or distributed to upper layer data applications 302 residing on the client device 300. In particular, latency measurements can be distributed in non-real time to the upper layer data applications 302. In some examples, an upper layer data application 302 queries the second database 314 for latency measurements associated with the upper layer data application 302. In these examples, the upper layer data application 302 can be configured by a software development kit (SDK) for interfacing with the second database 314 to obtain latency measurements from the second database 314. Alternatively or additionally, the upper layer data application 302 queries the second database 314 via an application programming interface (API) of the second database 314.

In some examples, latency measurements are distributed to an upper layer data application 302 based on certain conditions being satisfied or triggered. For example, based on an average latency measurement (e.g., over hours, over days, over weeks) exceeding a threshold, latency measurements are provided to an upper layer data application 302 for a pre-determined time period. As another example, latency measurements are provided to an upper layer data application 302 in response to a data-connection packet indicating a transmission failure or being a re-transmission. As yet another example, latency measurements are provided to an upper layer data application 302 in response to a threshold number of re-transmissions occurring in the data-connection packets.

The latency measurement stored in the second database 314 can also be provided to a dashboard application that is configured to display latency information to an end user of the client device 300. In some implementations, the dashboard application is configured to display latency measurements for each upper layer data application, latency measurements for groups or categories of upper layer data applications, latency measurements by communication protocol, trends of latency measurements over time periods, and/or the like.

In some implementations, latency measurements stored in the second database 314 can be provided to remote servers in communication with the upper layer data applications of the client device 300. For example, the communication module 304 and/or the daemon 306 can automatically retrieve latency measurements relevant to a particular remote server and transmit the latency measurements to the remote server. The remote server can then perform dynamic load-balancing operations based on receiving latency measurements from multiple client devices that were determined on-device. The remote server can direct traffic through and allocate resources among edge nodes, core network nodes, nodes of a content delivery network (CDN), and/or the like.

Thus, according to aspects of the present disclosure, data records are stored and then accessed at any time to determine latency measurements. The latency measurements are then provided to interested parties (e.g., upper layer data applications residing on the client device 300, a remote server, an end user of the client device 300) on-demand, on certain conditions being satisfied, or generally in non-real time.

Exemplary Real Time Latency Detection

Figure 4:
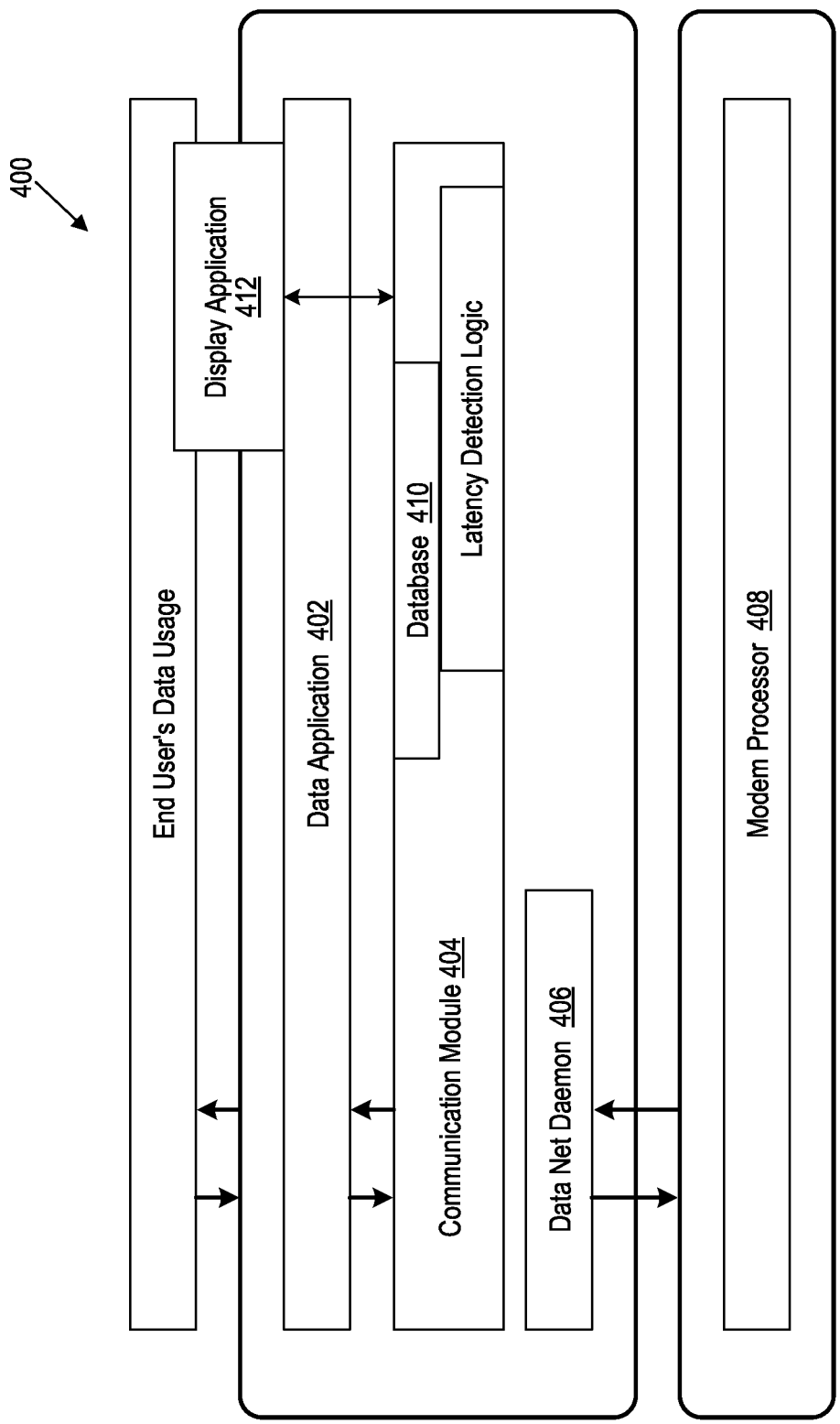
FIG. 4 is a block diagram that illustrates components or modules for providing on-device latency detection in real time.

Referring now to FIG. 4, a block diagram that illustrates components of a client device 400 is provided. The client device 400 includes the components for locally and natively determining latency measurements for data connections between local application clients and remote application servers. For example, some components of the client device 400 as illustrated and described herein can correspond to a latency detection module 208 illustrated in FIG. 2. In some implementations, components of client device 400 for on-device latency detection are configured to determine latency measurements in the background at an OS level of the client device 400. According to some aspects of the present disclosure, the latency measurements are provided or distributed to local application clients residing in an upper level or layer of the client device 400 in a real time manner as the latency measurements are determined.

Similar to the implementation illustrated in FIG. 3, client device 400 includes at least one upper layer data application 402 that establishes a connection with a remote server and/or communicates data with the remote server via a communication module 404, a daemon 406, and a modem processor 408. As discussed, the communication module 404 is implemented at the OS level of the client device 400 such that the communication module 404 is shared and used by multiple upper layer data applications 402 to communicate with remote servers and systems.

Here, in example implementations, latency detection is built into the functionality of the communication module 404. Accordingly, as the communication module 404 (or sub-modules thereof) configures packets for transmission and decodes received packets according to various communication protocols, the communication module 404 also determines latency measurements. That is, the communication module 404 determines latency measurements concurrently with or within a time window after packets being transmitted from and to the client device 400 (e.g., in real-time). With latency detection functionality being built into the communication module 404, inter-module interfacing within the OS layer of the client device 400 is reduced, as with memory and storage requirements.

As with non-real time implementations, the communication module 404 records or copies portions of data-connection packets (e.g., packet headers or fields thereof) and associates the recorded or extracted portions with timestamps. In some implementations, the communication module 404 includes a record repository or database 410. Based on the recorded information in the record repository or database 410, the communication module 404 determines latency measurements (e.g., in accordance with techniques described herein) and forwards the latency measurements to the appropriate upper layer data applications 402.

In some implementations, the communication module 404 is configured to periodically determine and distribute latency measurements according to a configured frequency. The periodic determination and automatic distribution (e.g., in real-time) of latency measurements for an upper layer data application 402 can be performed while a network socket for the upper layer data application 402 is open. While the network socket is closed, latency measurements can be determined and distributed in response to a query (e.g., an API call defined by an SDK) by the upper layer data application 402. In the event of such a query, latency measurements can be determined based on the most recent data records stored in the record repository or database 410.

In some implementations, multiple network sockets are allocated and used by an upper layer data application 402, and latency measurements specific to each network socket are provided to the upper layer data application 402. For example, a matrix of latency measurements or averaged values for the multiple network sockets are provided to the upper layer data application 402.

As illustrated, latency measurements are provided to a dashboard application 412, or an upper layer display application. The dashboard application 412 is configured to display graphs of latency measurements, trends of latency measurements, sorted or grouped latency measurements (e.g., socket-wise latency, protocol-wise latency, application-wise latency), and/or the like to an end user of the client device 400. In some implementations, the communication module 404 provides the latency measurements to the dashboard application 412, or a display application or interface application residing on an upper application level, on a periodic basis.

It will be appreciated that various features described in the context of non-real time implementations and in the context of real-time implementations can be combined or interchanged.

Exemplary Operations

Figure 5:
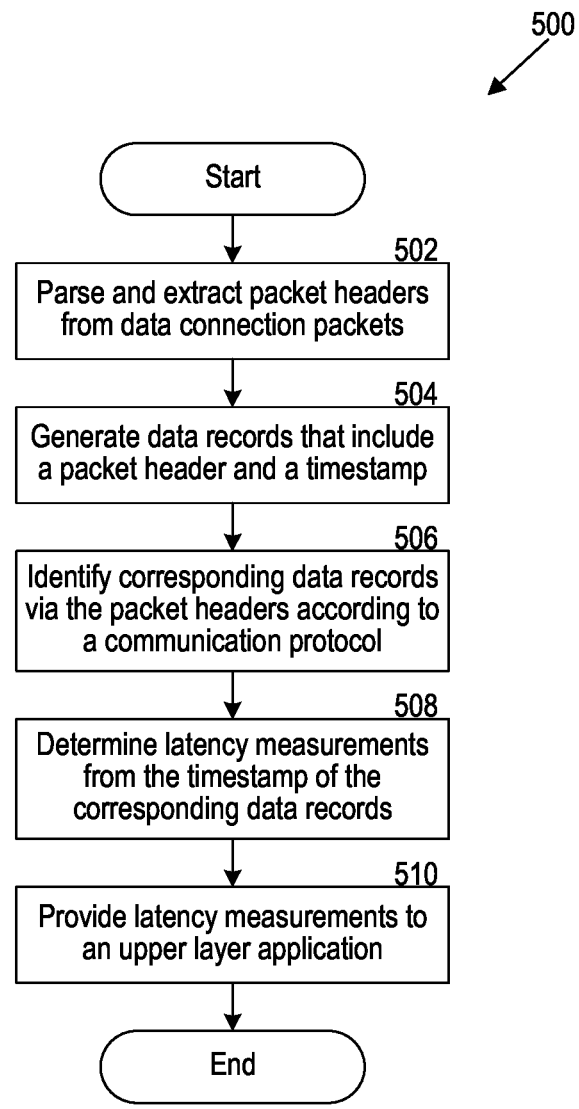
FIG. 5 is a flow diagram illustrating an example process for locally detecting or measuring latency on a client device or system.

FIG. 5 is a flow diagram illustrating a process 500 for locally detecting or measuring latency on a system performing the process 500. The process 500 is performed by a system (e.g., a client device) that transmits data-connection packets to a remote application server and that receives data-connection packets from the remote application server. In some implementations, the system performing process 500 embodies one or more of: a wireless device 104 of FIG. 1A, a wireless device 152 of FIG. 1B, the computing device 200 of FIG. 2, the client device 300 of FIG. 3, the client device 400 of FIG. 4, and/or a computing system 600 illustrated in FIG. 6.

The process 500 begins at block 502, where packet headers of data-connection packets are parsed and extracted. The packet headers are parsed and extracted according to a communication protocol associated with the data-connection packet. For example, if the data-connection packet is a DNS packet, a transaction identifier and a QR bit are extracted from the packet header of the DNS packet. As another example, if the data-connection packet is a TCP packet, a sequence number and an acknowledgement number are extracted from the packet header of the TCP packet. Generally, the packet headers are parsed and extracted such that protocol-specific relationships between different data-connection packets can be identified from the extracted data.

In some implementations, the data-connection packets relate to transmission between a local application client residing in an upper layer of the system performing the process 500 and an application server remote to the system. In some implementations, the packet headers of the data-connection packets are parsed and extracted while the data-connection packets are being processed for transmission or being processed after reception.

The process 500 then proceeds to block 504, where data records that each represent or correspond to a data-connection packet are generated. Each data record associates a data-connection packet with a timestamp, such as the timestamp that the packet is transmitted or received. To conserve memory storage, a data record can include an extracted portion of the data-connection packet (e.g., the packet header, specific bit fields of the packet header) and a timestamp. In some implementations, the data record further includes an application or process identifier that indicates an upper layer application for which the data-connection packet is transmitted or received, or the upper layer application that is an endpoint for the data-connection packet. In some implementations, the data records are stored in a first database that is configured by access or security policies to be inaccessible by the upper layer applications, thus preserving privacy of data packets among the upper layer applications.

The process 500 then proceeds to block 506, where corresponding data records of the plurality of data records are identified. That is, data records that correspond to related data-connection packets (e.g., query and response packets, handshake packets) are matched together. In particular, the data records are matched using the packet headers included in the data records. In various examples, a group of corresponding data records includes two or more data records, and some of the corresponding data records can correspond to failed packet transmissions or re-transmissions.

The process 500 then proceeds to block 508, where latency measurements are determined from the corresponding or matched data records. In some examples, a latency measurement is determined based on a difference between the timestamps of the corresponding or matched data records (e.g., a pair of a DNS query and a DNS response). In some examples, a latency measurement is determined based on time spanned by timestamps of a sequence of corresponding data records (e.g., corresponding to a sequence of TCP packets).

A latency measurement can be associated with a particular application client residing in an upper layer of the system performing process 500 based on the data records corresponding to data-connection packets transmitted from or received by the particular application client. For example, a latency measurement is associated with an application or a process identifier of the particular application client, which is an endpoint for the data-connection packets. In some implementations, the latency measurements are stored in a second database that is configured by access or security policies to be accessible by application clients residing in an upper layer of the system.

The process 500 then proceeds to block 510, wherein the latency measurements are provided to application clients residing in an upper layer of the system performing the process 500. The latency measurements can be provided in response to a query from a particular application client or a threshold condition being satisfied (e.g., in non-real time, or at a time not related to determination of the latency measurements), or can be distributed to the application clients automatically once the latency measurements are determined (e.g., in real-time, or at a time directly dependent on the determination of the latency measurements). In some implementations, alternation between non-real time and real time distribution of the latency measurements can be controlled, such as based on power or resource availability of the system performing the process 500 or based on user configuration.

In some implementations, the latency measurements are provided to a dashboard application configured to display latency information for an end user of the system. The displayed latency information can indicate the raw latency measurements, grouped or sorted latency measurements, averaged latency measurements, a latency log, and/or the like. In some implementations, the dashboard application displays a latency log with log entries that indicate an application name (or process ID), latency measurements, a number of retries or re-transmissions, a network type, and a radio frequency (RF) status. Examples of RF status information indicated via the dashboard application include signal strength and quality such as Radio Signal Reception Power or Radio Signal Reception Quality. The RF information can be acquired from another separate API between a modem processor and/or other modules of a Radio Interface Layer. A communication module can acquire the RF information in common APIs (e.g., public or private APIs) within the OS.

In some implementations, the dashboard displays latency measurements sorted by communication protocol (e.g., an average latency for DNS communications, an average latency for TCP handshakes). With this, selection of particular communication protocols for optimal communication performance can be intelligently guided.

In some implementations, the process 500 further includes operations for transmitting latency measurements to a remote system (e.g., the application server) that is configured to perform dynamic load-balancing operations. The remote system can receive latency measurements determined by multiple client devices and use such on-device and device-specific latency measurements to dynamically distribute communication traffic among various servers of the remote system. Accordingly, in response to transmitting latency measurements to a remote system configured for dynamic load balancing, a client device can receive an updated network address from the remote system, with the updated network address being expected to enable reduction of latency in communications between the system performing the process 500 and the remote system.

Exemplary Computer System

Figure 6:
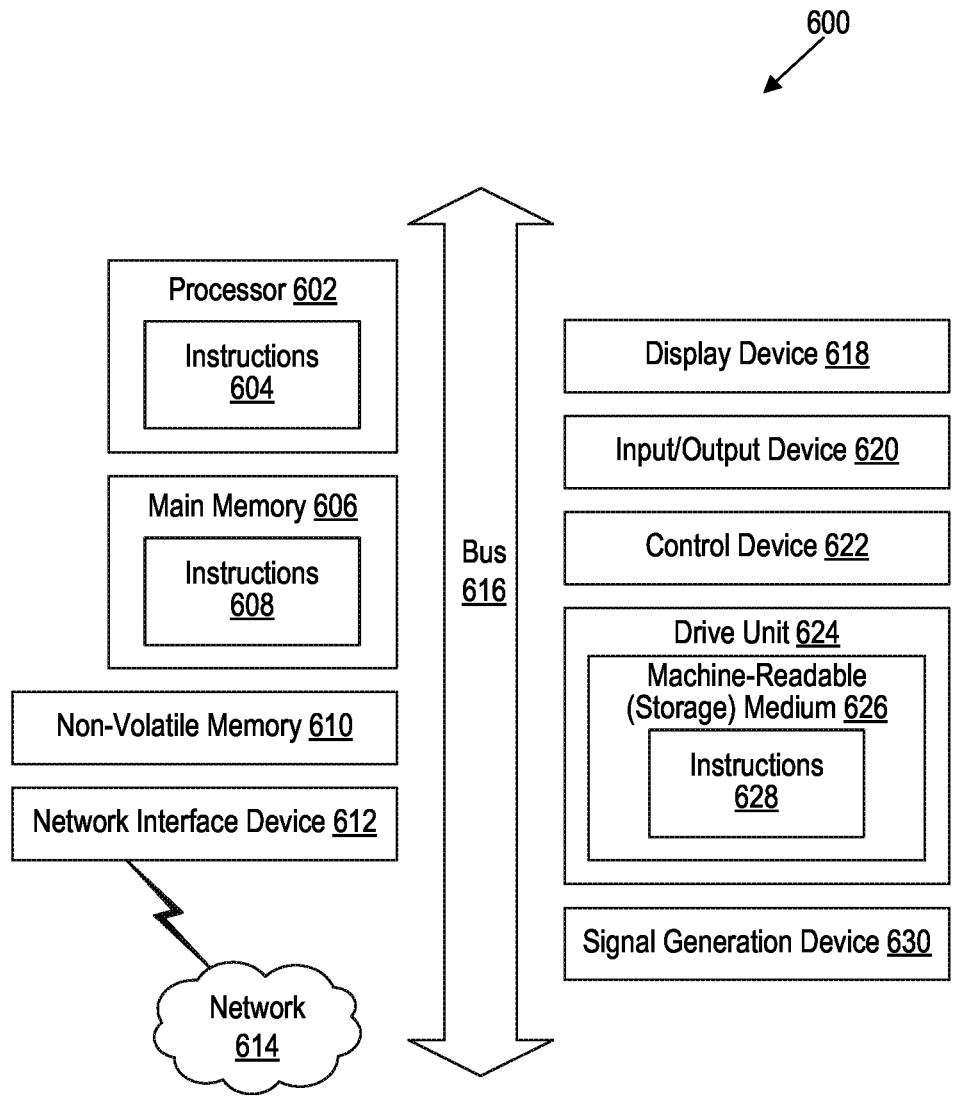
FIG. 6 is a block diagram that illustrates an example of a computer system in which at least some operations described herein can be implemented.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, video display device 618, an input/output device 620, a control device 622 (e.g., keyboard and pointing device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computing system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 600. In some implementation, the computer system 600 can be an embedded computer system, a system-on-chip (SOC), a single-board computer system (SBC) or a distributed system such as a mesh of computer systems or include one or more cloud components in one or more networks. Where appropriate, one or more computer systems 600 can perform operations in real-time, near real-time, or in batch mode.

The network interface device 612 enables the computing system 600 to mediate data in a network 614 with an entity that is external to the computing system 600 through any communication protocol supported by the computing system 600 and the external entity. Examples of the network interface device 612 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computing system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computing system 600 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number can also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the present disclosure can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A system for on-device latency detection, the system comprising:
    at least one hardware processor; and
    at least one non-transitory memory, coupled to the at least one hardware processor and storing instructions, which when executed by the at least one hardware processor, perform a process, the process comprising:
        parsing and extracting packet headers of a plurality of data-connection packets that are transmitted between an application client that is local to the system and an application server that is remote to the system via a plurality of network sockets of the system that are associated with the application client;
        generating a plurality of data records that each correspond to a respective data-connection packet, wherein each data record includes the packet header of the respective data-connection packet and a timestamp;
        identifying a set of related data records from the plurality of data records based on the packet header that is included in each data record, wherein the related data records correspond to a set of data-connection packets that are related to one another according to a particular communication protocol;
        determining one or more latency measurements for the application client based on the timestamps of each of the set of related data records, the one or more latency measurements comprising a latency matrix that includes latency values corresponding to the plurality of network sockets associated with the application client;
        detecting a query by the application client for the one or more latency measurements for the application client; and
        while the plurality of network sockets associated with the application client are closed, providing, from an operating system (OS) kernel level of the system where the one or more latency measurements are determined, to an upper application level where the application client resides, the one or more latency measurements for the application client in response to the query.

2. The system of claim 1, wherein the set of related data records correspond to (i) from data-connection packets that are configured according to a DNS protocol, or (ii) data-connection packets that are configured according to transmission control protocol (TCP).

3. The system of claim 1, wherein the process further comprises:
transmit, from the system where the application client is local, the one or more latency measurements for the application client to the application server in connection with a dynamic load-balancing operation of the application server,
wherein the dynamic load-balancing operation of the application server includes receiving latency measurements for a plurality of application clients at different systems.

4. The system of claim 1, wherein the plurality of data records are stored in a first database for which access by the application client is limited, wherein the one or more latency measurements are stored in a second database configured for queries by the application client, and wherein the first database and the second database are implemented at the OS kernel level of the system.

5. The system of claim 1, wherein each data record further includes an application client identifier associated with the application client to or from which the respective data-connection packet is transmitted, and wherein the one or more latency measurements are provided from the OS kernel level to the application client based on the application client identifier included in the set of related data records.

6. A non-transitory computer-readable storage medium for on-device latency detection, storing instructions that, when executed by at least one data processor of a system, cause the system to:
extract, within an OS kernel implemented for the system, packet headers of a plurality of data-connection packets that are transmitted between an application client that is local to the system and an application server that is remote to the system via a plurality of network sockets of the system that are associated with the application client;
store a plurality of data records that each include the packet header of a respective data-connection packet and a timestamp;
in response to a query by the application client that resides on an upper user level of the system:
access the plurality of data records to identify related data records based on the packet header included in each data record,
determine, at the OS kernel, a latency measurement based on the timestamps of the related data records, wherein the latency measurement comprises a latency matrix that includes latency values corresponding to the plurality of network sockets associated with the application client, and
while the plurality of network sockets associated with the application client are closed, provide, from the OS kernel to the upper user level where the application client resides, the latency measurement to the application client.

7. The non-transitory computer-readable storage medium of claim 6, wherein the related data records correspond to a set of data-connection packets that are related to one another according to a particular communication protocol.

8. The non-transitory computer-readable storage medium of claim 6, wherein the latency measurement is specific to the application client based on the related data records corresponding to data-connection packets transmitted to or from the application client.

9. The non-transitory computer-readable storage medium of claim 6, wherein the plurality of data records are stored at a database implemented within the OS kernel of the system.

10. The non-transitory computer-readable storage medium of claim 6, wherein the latency measurement is provided to the application client via an application programming interface (API) residing on an OS level of the system.

11. The non-transitory computer-readable storage medium of claim 6, wherein the instructions further cause the system to:
transmit, from the system where the application client is local, the latency measurement to the application server in connection with a dynamic load-balancing operation of the application server,
wherein the dynamic load-balancing operation of the application server includes receiving latency measurements for a plurality of application clients at different systems.

12. The non-transitory computer-readable storage medium of claim 6, wherein the latency measurement is automatically provided to the application client based on an average latency exceeding a pre-determined threshold, the average latency being determined based on the latency measurement.

13. The non-transitory computer-readable storage medium of claim 6, wherein the latency measurement is automatically provided to the application client based on at least one of the related data records corresponding to a data-connection packet that is indicated as a re-transmission.

14. A non-transitory computer-readable storage medium for on-device latency detection, storing instructions that, when executed by at least one data processor of a system, cause the system to:
cause transmission or reception of a plurality of data-connection packets between an application client that is local to the system and an application server that is remote to the system via a plurality of network sockets of the system that are associated with the application client;
for each data-connection packet, associate a timestamp with a local copy of a packet header that belongs to the data-connection packet;
determine, at an OS kernel of the system, a latency measurement based on the timestamps associated with local copies of packet headers that belong to a set of data-connection packets that are related to one another according to a communication protocol, wherein the latency measurement comprises a latency matrix that includes latency values corresponding to the plurality of network sockets associated with the application client;
detect a query by the application client for the latency measurement for the application client; and
while the plurality of network sockets associated with the application client are closed, distribute, from the OS kernel to an upper application level where the application client resides, the latency measurement to the application client in response to the query.

15. The non-transitory computer-readable storage medium of claim 14, wherein the instructions further cause the system to cause display of the latency measurement at a user interface of the system based on providing, from the OS kernel, the latency measurement to a display application that resides on the upper application level of the system via an API.

16. The non-transitory computer-readable storage medium of claim 14, wherein the set of data-connection packets that are related to one another includes a DNS query packet and a DNS response packet whose packet headers include a same transaction identifier.

17. The non-transitory computer-readable storage medium of claim 14, wherein the set of data-connection packets includes at least three TCP packets whose packet headers together define an incrementing pattern of sequence numbers and acknowledgement numbers.

18. The non-transitory computer-readable storage medium of claim 16, wherein the instructions further cause the system to:
- transmit, from the system where the application client is local, the latency measurement to an application server in connection with a dynamic load-balancing operation of the application server,
  - wherein the dynamic load-balancing operation of the application server includes receiving latency measurements for a plurality of application clients at different systems.

* * * * *